July 23, 1957  E. L. BARCUS ET AL  2,800,542
DIRECTION SIGNAL

Filed Aug. 12, 1955  2 Sheets-Sheet 1

INVENTORS
Edward L. Barcus,
Robert N. Paige &
Lloyd T. Fuqua
By Paul Fitzpatrick
Attorney July 23, 1957  E. L. BARCUS ET AL  2,800,542
DIRECTION SIGNAL Filed Aug. 12, 1955  2 Sheets-Sheet 2

INVENTORS
Edward L. Barcus,
Robert N. Fadge &
Lloyd T. Fuqua
By Paul Fitzpatrick
Attorney

United States Patent Office 2,800,542
Patented July 23, 1957

2,800,542

DIRECTION SIGNAL

Edward L. Barcus and Robert N. Falge, Anderson, and Lloyd T. Fuqua, Fortville, Ind., assignors to General Motors Corporation, Detroit, Mich., a corporation of Delaware Application August 12, 1955, Serial No. 527,967

16 Claims. (Cl. 200—61.34)

This invention relates to direction signal switch mechanisms and more particularly to switch operating mechanisms adapted for mounting in concentric relation with the steering column of a motor vehicle adjacent the steering wheel thereof.

An object of the present invention is to provide an improved direction signal mechanism of the type disclosed in the copending application Serial No. 453,404, Edward L. Barcus, entitled Direction Signal Switch Mechanism, assigned to General Motors Corporation.

Another object is to provide a manually set automatically reset signal cancelling mechanism of simplified construction and improved operation.

A further object is to provide a mechanism of the stated character wherein the functions of bypassing, cancelling, and overriding are effected by a single element thereby materially substantially reducing the total parts required.

A further object is to provide a signal operating mechanism in which a single flexible element is formed and arranged to effect automatic signal cancelling responsive to vehicle steering wheel rotation in either direction, the single element being further effective to yieldably maintain the manual signal setting member in any of a plurality of positions.

Another object is to provide a switch mechanism of the stated character wherein end portions of the flexible member are capable of limited flexible movement relative to the main body portion of said member.

These and other objects and advantages will become more fully apparent as reference is had to the accompanying specification and drawings wherein.

Figure 1:
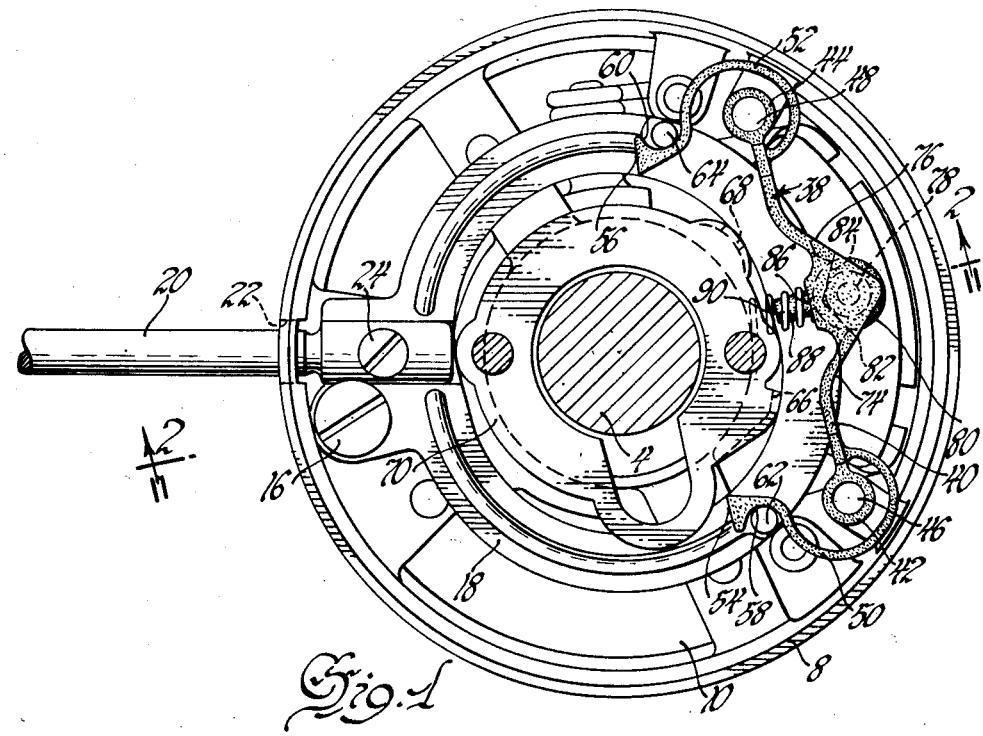
Fig. 1 is a plan view, partly in section, illustrating the arrangement of parts when the mechanism is in a neutral position.
Figure 2:
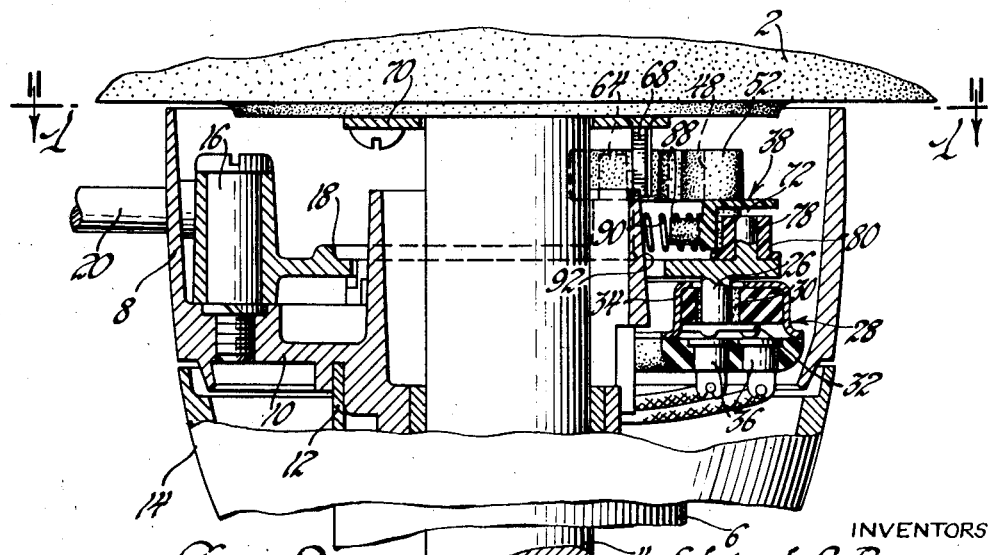
Fig. 2 is a fragmentary elevational view, partly in section, looking in the direction of arrows 2—2 of Fig. 1.

Referring now to the drawings and particularly Figs. 1 and 2, the reference numeral 2 indicates generally the central hub portion of a vehicle steering wheel, not shown. Steering wheel hub 2 is secured in a convetnional manner to the upper end of a steering shaft 4. Disposed in concentric relation about shaft 4 is a tubular steering column or jacket 6, the upper end of which is axially spaced from the base of steering wheel hub 2. Disposed between hub 2 and jacket 6 is a generally cylindrical housing 8. Housing 8 is formed with an integral web or base 10 having a central downwardly directed pilot portion 12 which is slidably received in the upper end of steering column 6 and secured therein against axial and rotary movement in any convenient manner. A second housing 14 is disposed below housing 8 in abutting relation with the lower face thereof. Housing 14 serves to cover the base 10 of housing 8 and the outside wall thereof curves gradually inwardly to blend with column 6.

Pivotally mounted interiorly of housing 8 by means of threaded pivot stud 16 is a generally circular operating ring 18 which is swingably movable transversely in housing 8 by means of an outwardly directed operating handle 20. Handle 20 extends through an opening 22 formed on housing 8 and is threadably secured to ring 18 by means of machine screw 24.

Generally opposite stud 16, ring 18 is formed with an integral depending pin 26 which is adapted to operatively engage an electrical switch 28 secured to web 10. As seen in Fig. 2, pin 26 extends into a pocket or slot 30 formed in a movable bridging contact element 32, which is carried interiorly of the housing 34 of electrical switch 28. Since the precise construction of switch 28 forms no part of the invention, a detailed description thereof is omitted. It will be understood, however, that transverse swinging movement of ring 18 causes horizontal arcuate movement of bridging element 32 relative to housing 34, thereby aligning the bridging element 32 in various relationships with switch terminals 36 to cause energization and deenergization of the switch in correlation with the right and left operating positions of lever 20.

Figures 4, 5:
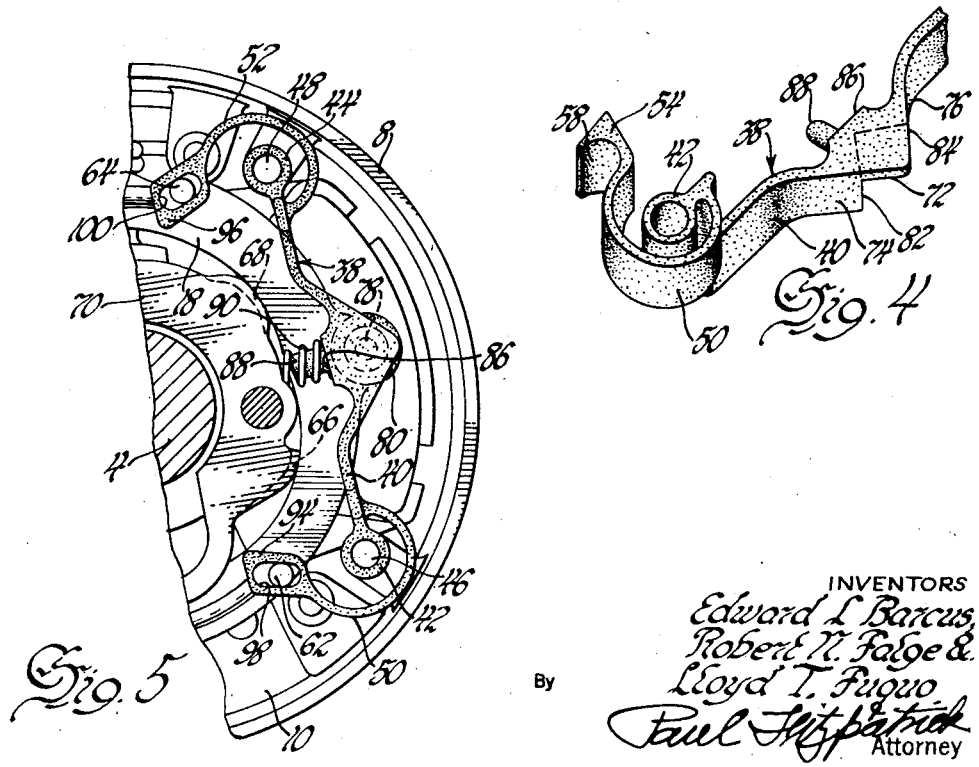
Fig. 4 is an enlarged fragmentary perspective view illustrating the configuration of the symmetrical flexible signal cancelling element.
Fig. 5 is a fragmentary plan view, partly in section, illustrating a modification of the mechanism shown in Fig. 1.

In order to automatically return ring 18 to the neutral position shown in Fig. 1 after manual setting thereof to either of its operating positions, in accordance with the present invention there is provided a one-piece flexible element 38 which is of molded nylon construction, the configuration of which is most apparent from Fig. 4. While element 38 is preferably formed of molded nylon, it will be understood that its construction is not necessarily limited to a particular material. As seen in Fig. 4, element 38 is provided with an elongated central body portion 40 having hub portions 42 and 44 formed integrally therewith at opposite ends thereof. Hub portions 42 and 44 are disposed over upstanding pins 46 and 48 formed at opposite sides of web 10 and thereby retain element 38 in fixed relation to web 10. Partially surrounding each hub portion 42 and 44 are curved portions 50 and 52 which merge with element 38 slightly inwardly of hubs 42 and 44. At their outer ends, curved portions 50 and 52 are provided with enlarged generally wedge-shaped tips 54 and 56. Wedge extremities 54 and 56, in turn, are formed with outwardly facing curved base portions 58 and 60 which are adapted for abutting contact with a second pair of upstanding pins 62 and 64 formed integrally on ring 18. As seen in Fig. 1, when ring 18 is in the central neutral position, pins 62 and 64 are spaced equidistant radially from steering shaft 4 and occupy positions which permit wedge portions 54 and 56 to swing arcuately outwardly to provide clearance for the circular path of movement of depending cancelling elements 66 and 68. Elements 66 and 68, in turn, are formed on a carrier 70 which is secured to and depends downwardly from the base of steering hub 2. In this connection, it will be understood that nylon element 38 is so formed that when in the free or relaxed position, the curved portions 50 and 52 tend to "unwrap" in counterclockwise and clockwise directions, respectively. Accordingly, when in assembled relation, the curved portions 50 and 52 are stressed in clockwise and counterclockwise directions, respectively, by pins 62 and 64. Therefore, the wedge portions 54 and 56 are urged into yielding abutting contact with pins 62 and 64, respectively.

Figure 3:
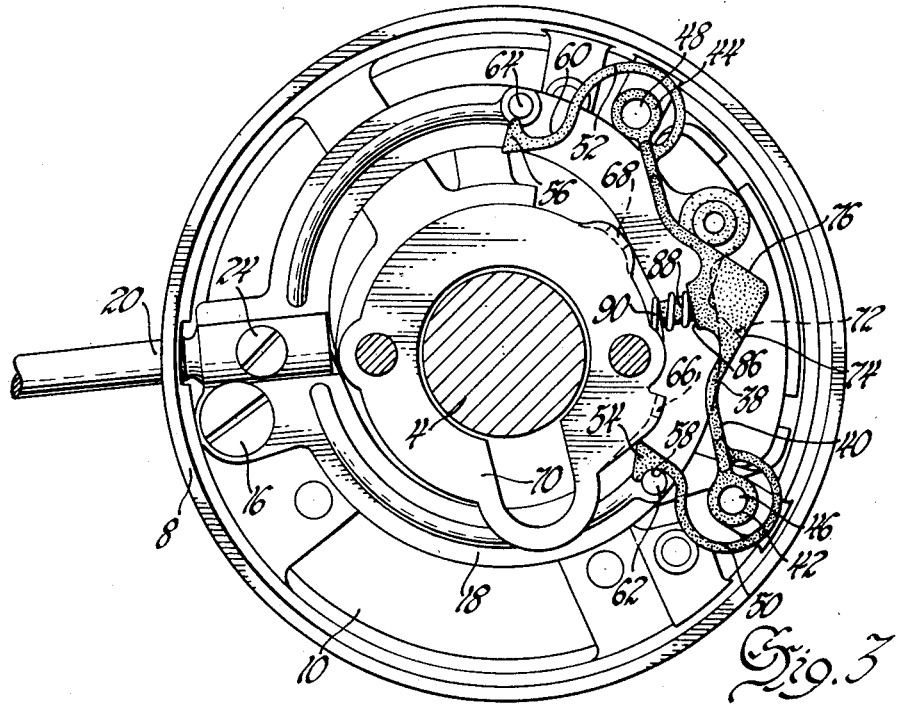
Fig. 3 is a view similar to Fig. 1 showing the position of the parts when the mechanism is in a left turn signal operating position.

As seen best in Fig. 3, when the operating lever 20 is swung downwardly to the left turn indicating position, ring 18 swings upwardly about pivot 16. Since pins 62 and 64 are carried by ring 18, pin 64 swings arcuately upwardly away from wedge-shaped portion 56 and permits the curved portion 52 to relax to its preformed curvilinear configuration, thereby withdrawing wedge portion 56 further from the path of movement of cams 66 and 68. Conversely, pin 62 moves arcuately inwardly thereby causing wedge portion 54 to move to a position intersecting the path of movement of cams 66 and 68. With the mechanism in the position illustrated in Fig. 3, when the steering wheel is rotated counterclockwise for a left turn, the cancelling elements 66 and 68 on carrier 70 approach the left side of wedge portion 54 in a counterclockwise direction. As elements 66 and 68 engage wedge 54, the latter is yieldably displaced in a clockwise direction against the resistance of curved portion 50 to clear the path of elements 66 and 68, whereupon wedge 54 is returned to abutting engagement with pin 64 by the tension of curved portion 50. Upon reversal of rotation of the steering wheel to return the vehicle to the straight ahead position, elements 66 and 68 approach and engage the right side of wedge-shaped portion 54 in a clockwise direction and impose forces tending to cause counterclockwise swinging movement of portion 54. However, since counterclockwise movement of wedge 54 is resisted by upstanding pin 62 on ring 18, continued clockwise rotation of elements 66 and 68 cause wedge-shaped portion 54 to cam ring 18 about pivot 16 to the neutral position. It will be understood that the operation of the mechanism during the right turn is identical with the foregoing description except in the reverse sense.

In order to prevent damage to the mechanism in the event that handle 20 is forcibly or inadvertently restrained against normal cancelling action, curved portions 50 and 52 of element 38 are so constructed as to permit yielding distortion sufficient to permit segments 66 and 68 to override wedge portions 54 or 56. Thus, when the mechanism is jammed or restrained, cancelling pressure exerted on the tip of wedge-shaped portion 54 causes the wedge to act as a lever fulcrumed at pin 62. The lever action of portion 54 causes temporary bodily distortion of portion 50 sufficient to permit wedge portion 54 to angle outwardly until the terminal extremity thereof clears the orbit of cancelling elements 66 and 68. As soon as each element 66 and 68 clears the tip of wedge 54, curved portion 50 resumes its normal curved configuration, causing wedge 54 to again occupy the position intersecting the path of elements 66 and 68. Consequently, the mechanism will resume normal operation upon removal of the obstruction or restraint.

According to another feature of the invention, the central body portion 40 of nylon element 38 is constructed and arranged for cooperation with ring 18 in a manner causing the latter to be yieldably restrained in three defined positions corresponding with the neutral, left and right operating position of switch 28. As seen in Fig. 4, the outwardly facing vertical wall of central portion 40 is formed to provide a central outwardly facing notch 72 and a pair of inwardly sloping walls 74 and 76. Ring 18, in turn, is formed with an upstanding pin 78 upon which is rotatably mounted a flanged nylon roller 80. Nylon roller 80 is so located as to yieldably deform central portion 40 laterally inwardly. Accordingly, the central body portion 40 of nylon element 38 yieldably restrains roller 80 in a position aligned with notch 72. Upon swinging movement of ring 18 in either direction from a neutral position, central portion 40 is displaced yieldably inwardly by lateral movement of roller 80 until the latter passes either crest 82 or 84. After movement of ring 18 until roller 80 passes either crest 82 or 84, central portion 40 flexes outwardly to a position causing either wall 74 or 76 to resiliently retain roller 80 and ring 18 in a position corresponding to one of the swtich operating positions. In order to assure maximum reliability and freedom from gradual fatigue due to cold flow, the inherent spring characteristics of central portion 40 may be augmented by additional spring means interposed between web portion 10 of housing 8 and the central boss 86 of central portion 40. In the embodiment illustrated, boss 86 is formed with an inwardly directed projection 88 over which is disposed a coil spring 90. Coil spring 90, in turn, bears against the outer wall of sleeve portion 92 of web 10. It will be understood, however, that augmenting springs are not necessarily essential nor need not take the form illustrated.

In Fig. 5, there is illustrated a modification of the invention. In the modification shown, the curved portions 50 and 52 of nylon element 38 are formed with enlarged wedge-shaped portions 94 and 96 having vertically directed elongated slots 98 and 100 formed therein which slidably embrace pins 62 and 64. With element 38 modified in the manner illustrated, it has been found that the objectionable operating noises are virtually eliminated since portions 94 and 96 are maintained in constant engagement with pins 62 and 64, rather than being intermittently bodily displaced therefrom by the action of cancelling elements 66 and 68.

In order that the modified form of mechanism may be more readily understood, a description of the operation follows:

When the operating handle 20 is adjusted to a left turn signaling position, similar to that shown in Fig. 3, upward swinging movement of ring 18 causes pin 62 and 64 to swing therewith in the same manner as described in connection with the preferred embodiment. Therefore, pin 64 displaces wedge portion 96 slightly outwardly from the orbit of cancelling elements 66 and 68, while pin 62 shifts wedge portion 94 inwardly to a position intersecting the orbit of cancelling elements 66 and 68. With wedge portion 94 in the position described, when the steering wheel is rotated counterclockwise for a left turn, cancelling elements 66 and 68 approach the left side of wedge portion 94 in a counterclockwise direction. Because of the direction of elongated slot 98 in wedge portion 94, pressure of element 66 or 68 causes wedge portion 94 to shift linearly outwardly relative to pin 62 until element 66 or 68 clears the tip of wedge 94. As soon as element 66 or 68 passes wedge 94, the latter is yieldably urged to its former orbit intersecting position by virtue of the flexible character of curved portion 50. Upon reversal of rotation of the steering wheel, element 66 or 68 approaches and engages the right side of wedge portion 94 and imposes forces thereon tending to cause counterclockwise rotation. Due to the direction of elongated slot 98 which guides wedge 94, the latter tends to move further into the orbit of elements 66 and 68. Consequently, continued movement of element 66 or 68 tends to cam ring 18 about its pivot 16 to the neutral position. However, should external force or obstruction resist return of ring 18 to neutral, cancelling pressure of element 66 or 68 causes wedge 94 to function as a lever fulcrumed at pin 62. The lever action of wedge 94 causes temporary bodily distortion of portion 50 sufficient to permit wedge 94 to angle outwardly until the terminal extremity thereof clears the orbit of cancelling element 66 or 68. Upon passage of each cancelling element, wedge portion 94 will again resume its normal position responsive to urging of curved portion 50 in the same manner as described with respect to the preferred embodiment. It will be noted, however, that all movement of wedge portions 94 and 96 relative to their respective pins 62 and 64 are such that no impact occurs therebetween. Consequently, clicking or snapping during operation of the mechanism is virtually eliminated.

From the foregoing, it will be seen that a novel and substantially simplified direction signal switch operating mechanism has been devised. The device not only requires an extraordinarily small number of parts, but, in addition, permits considerable latitude in the degree of accuracy of alignment of the various parts, thereby substantially simplifying initial assembly and assuring subsequent freedom from malfunction due to slight variations in alignment of the parts.

While two embodiments of the invention have been shown and described, it will be understood that numerous changes and modifications may be made therein. It is, therefore, to be understood that it is not intended to limit the invention to the embodiments shown but only by the scope of the claims which follow.

We claim:

1. A direction signal switch operating mechanism comprising a housing, an operating member pivotally mounted in said housing for movement from a neutral position to switch operating positions at opposite sides of said neutral position, cam means movable in a circular path, a flexible member mounted at spaced points intermediately thereof on said housing, curved portions connected to said member at opposite ends thereof, and means carried by said ring adjacent said curved portions for angularly positioning the latter for engagement by said cam.

2. A direction signal switch operating mechanism comprising a housing, an operating ring pivotally mounted in said housing for movement from a neutral position to switch operating positions at opposite sides of said neutral position, cam means movable in a circular path, a flexible member mounted at spaced points intermediately thereof on said housing, curved portions connected to said member at opposite ends thereof, and means carried by said ring adjacent said curved portions for angularly positioning the latter for engagement by said cam.

3. A direction signal switch operating mechanism comprising a housing, an operating ring pivotally mounted in said housing for movement from a neutral position to switch operating positions at opposite sides of said neutral position, cam means movable in a circular path, a flexible plastic member mounted at spaced points intermediately thereof on said housing, curved portions connected to said member at opposite ends thereof, and means carried by said ring adjacent said curved portions for angularly positioning the latter for engagement by said cam.

4. A direction signal switch operating mechanism comprising a housing, an operating ring pivotally mounted in said housing for movement from a neutral position to switch operating positions at opposite sides of said neutral position, cam means movable in a circular path, a flexible nylon member mounted at spaced points intermediately thereof on said housing, curved portions connected to said member at opposite ends thereof, and means carried by said ring adjacent said curved portions for angularly positioning the latter for engagement by said cam.

5. A direction signal switch operating mechanism comprising a housing, a ring pivotally mounted in said housing for movement from a neutral position to switch operating positions at opposite sides of said neutral position, cam means movable in a circular path, a flexible member mounted at spaced points intermediately thereof on said housing, integral free end portions on said member extending beyond said points, and means carried by said ring adjacent said end portions for angularly positioning the latter to positions engageable by said cam.

6. A direction signal switch operating mechanism comprising a housing, a ring pivotally mounted in said housing for movement from a neutral position to switch operating positions at opposite sides of said neutral position, cam means movable in a circular path, a flexible member mounted at spaced points intermediately thereof on said housing, integral free end portions on said member extending beyond said points, means carried by said ring adjacent said end portions for angularly positioning the latter to positions engageable by said cam, and means on the midportion of said member resiliently engaging said ring to yieldably restrain said ring in said positions of adjustment.

7. A direction signal switch operating mechanism comprising a housing, a ring pivotally mounted in said housing for movement from a neutral position to switch operating positions at opposite sides of said neutral position, cam means movable in a circular path, a unitary flexible member pivotally mounted on transversely spaced projections extending from said housing, a curved flexible portion formed at each end of said member, a lobe formed at the terminal extremity of each curved portion, said curved portions being preformed to resiliently retain said lobes in angular positions clearing the path of said cam, and means carried by said ring adjacent said lobes effective to urge one or the other of said lobes into the path of said cam upon movement of said ring to one or the other of said operating positions, respectively.

8. A direction signal switch operating mechanism comprising a housing, a ring pivotally mounted in said housing for movement from a neutral position to switch operating positions at opposite sides of said neutral position, cam means movable in a circular path, a flexible plastic body pivotally mounted on transversely spaced projections extending from said housing, a plurality of notches formed in said body, means on said ring cooperating with said notches to yieldably retain said ring in adjusted positions, a curved flexible portion formed at each end of said body, a lobe formed at the terminal extremity of each curved portion, said curved portions being preformed to resiliently retain said lobes in angular positions clearing the path of said cam, and means carried by said ring adjacent said lobes effective to urge one or the other of said lobes into the path of said cam upon movement of said ring to one or the other of said operating positions, respectively.

9. A direction signal switch operating mechanism comprising a housing, a ring pivotally mounted in said housing for movement from a neutral position to switch operating positions at opposite sides of said neutral position, cam means movable in a circular path, a unitary flexible member having spaced integral hubs disposed over projections extending from said housing, a curvilinear portion formed at each end of said member, a wedge-shaped lobe portion formed at the terminal extremity of each curvilinear portion, said curvilinear portions being preformed to resiliently urge said lobe portions to positions clearing the orbit of said cam, abutments carried by said ring effective to urge one or the other of said lobes into the path of said cam upon movement of said ring to one or the other of said operating positions, respectively, and notch means formed on said flexible member between said hubs yieldably engaging said ring to maintain the latter in any of said positions of adjustment.

10. A direction signal switch operating mechanism comprising a housing, a ring pivotally mounted in said housing for movement from a neutral position to switch operating positions at opposite sides of said neutral position, cam means movable in a circular path, a unitary flexible member mounted at spaced points intermediately thereof on projections extending from said housing, a curved portion formed at each end of said member, a wedge-shaped portion formed at the terminal extremity of each curved portion, said curved portions being preformed to resiliently retain said wedge-shaped portions in centered positions clearing the path of said cam, and means carried by said ring abuttingly engageable with said wedge-shaped portions to urge one or the other of the latter into the path of said cam upon movement of said ring to one or the other of said operating positions, respectively, said last mentioned means being responsive to movement of said wedge portions in one direction to return said ring to neutral position.

11. A direction signal switch operating mechanism comprising a housing, a ring pivotally mounted in said housing for movement from a neutral position to switch operating positions at opposite sides of said neutral position, cam means movable in a circular path, a unitary flexible member mounted at spaced points intermediately thereof on projections extending from said housing, a curved portion formed at each end of said member, a wedge-shaped portion formed at the terminal extremity of each curved portion, said curved portions being preformed to resiliently retain said wedge-shaped portions in centered positions clearing the path of said cam, and means carried by said ring abuttingly engageable with said wedge-shaped portions to urge one or the other of the latter into the path of said cam upon movement of said ring to one or the other of said operating positions, respectively, said last mentioned means being responsive to movement of said wedge portions in one direction to return said ring to neutral position, said curved portion being capable of extreme bodily distortion to permit passage of said cam past said wedge portion when said ring is forcibly restrained against movement to neutral position.

12. A direction signal switch mechanism, a housing, a switch operating member pivotally mounted in said housing at one side thereof and movable from a central neutral position to operating positions at opposite sides of said neutral position, means on said member operatively engaging said switch, an elongated flexible member mounted at spaced points intermediately thereof on said housing, curved extensions formed at opposite ends of said member, a cam movable in a circular path, cam engaging portions formed at the terminal extremities of said curved portions, said curved portions normally urging said cam engaging portions in opposite directions, and means formed on said ring adjacent each of said wedge-shaped portions effective to displace the latter angularly into the path of said cam upon movement of said ring to an operating position, and detent means on said member for yieldably restraining said ring in said operating position.

13. A direction signal switch mechanism, a housing, an operating ring pivotally mounted on said housing at one side thereof, said ring being swingable from a central neutral position to operating positions at opposite sides of said neutral position, an electrical switch mounted in said housing, means on said ring operatively engaging said switch, an elongated flexible member mounted at spaced points intermediately thereof on said housing, curved extensions formed at opposite ends of said member, a cam movable in a circular path, cam engaging portions formed at the terminal extremities of said curved portions, said curved portions normally urging said cam engaging portions in opposite directions, a pair of projections on said ring pivotally engaging each of said cam engaging portions, said projections being effective to displace the former angularly into the path of said cam upon movement of said ring to an operating position, and detent means on said member for yieldably restraining said ring in said operating position.

14. A direction signal switch mechanism, a housing, an operating ring pivotally mounted on said housing at one side thereof, said ring being swingable from a central neutral position to operating positions at opposite sides of said neutral position, an electrical switch mounted in said housing, means on said ring operatively engaging said switch, an elongated flexible member mounted at spaced points intermediately thereof on said housing, curved extensions formed at opposite ends of said member, a cam movable in a circular path, cam engaging portions formed at the terminal extremities of said curved portions, said curved portions normally urging said cam engaging portions in opposite directions, a pair of projections on said ring pivotally engaging each of said cam engaging portions, said projections being effective to displace the former angularly into the path of said cam upon movement of said ring to an operating position, and lost motion means between said projections and said cam engaging portions permitting limited linear movement of said cam engaging portions relative to said projections.

15. In a direction signal switch mechanism, a housing, an electrical switch mounted in said housing, an operating ring pivotally connected to said housing and operatively engaging said switch, a rotatable cancelling cam, an elongated flexible member having curved end portions terminating in enlarged cam engaging portions, means for mounting said member at spaced points intermediately thereof on said housing, and means on said ring engaging the midportion of said member to yieldably retain said ring in a plurality of positions, and abutment means on said ring effective to move said cam engaging means into cam engaging positions upon movement of said ring to an operating position, said curved portions permitting flexible displacement of said cam engaging portions away from said abutment means responsive to movement of said cam in one direction, said cam engaging portions being flexibly displaceable toward said abutment means upon movement of said cam in the opposite direction to return said ring to neutral position.

16. In a direction signal switch mechanism, a housing, an electrical switch mounted in said housing, an operating ring pivotally connected in said housing and operatively engaging said switch, a rotatable cancelling cam, an elongated flexible member having curved end portions terminating in enlarged cam engaging portions, means forming slots in said cam engaging portions, means for mounting said member at spaced points intermediately thereof on said housing, and means on said ring engaging the midportion of said member to yieldably retain said ring in a plurality of positions, and pivot means on said ring engaging said slots, said pivot means being effective to move said cam engaging means into cam engaging positions upon movement of said ring to an operating position, said curved portions permitting flexible substantially linear displacement of said cam engaging portions relative to said pivot means responsive to movement of said cam in one direction, said cam engaging portions being angularly movable relative to said pivots upon movement of said cam in the opposite direction to return said ring to neutral position.

References Cited in the file of this patent

UNITED STATES PATENTS

| | | |
|---|---|---|
| 2,133,469 | Obergfell | Oct. 18, 1938 |
| 2,702,327 | Redick | Feb. 15, 1955 |
| 2,724,750 | Brown | Nov. 22, 1955 |
| 2,728,825 | Lincoln et al. | Dec. 27, 1955 |